(12) United States Patent
Schmid et al.

(10) Patent No.: US 12,147,816 B2
(45) Date of Patent: Nov. 19, 2024

(54) ENHANCING PROCESSING SPEED OF A REMOTE CONTROLLED RADIO FREQUENCY TEST OR MEASUREMENT DEVICE

(71) Applicant: Rohde & Schwarz GmbH & Co. KG, Munich (DE)

(72) Inventors: Bjoern Schmid, Munich (DE); Sebastian Roeglinger, Pfaffenhofen (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 75 days.

(21) Appl. No.: 18/056,923

(22) Filed: Nov. 18, 2022

(65) Prior Publication Data
US 2024/0168767 A1  May 23, 2024

(51) Int. Cl.
*G06F 9/44* (2018.01)
*G06F 9/4401* (2018.01)

(52) U.S. Cl.
CPC .................. *G06F 9/4411* (2013.01)

(58) Field of Classification Search
CPC ...................................... G06F 9/4411
See application file for complete search history.

(56) References Cited

U.S. PATENT DOCUMENTS

2005/0027832 A1* 2/2005 Bavaria ................ G06F 9/4411
                                              709/220
2021/0136559 A1  5/2021 Chastain et al.

* cited by examiner

*Primary Examiner* — Stefan Stoynov
(74) *Attorney, Agent, or Firm* — Studebaker & Brackett PC (57) ABSTRACT

A radio frequency test or measurement device for enhancing processing speed and reducing computational effort is configured to store at least one pre-calculated configuration set with an associated first unique identifier. The device is further configured to obtain a second UID via a communication network. The device is also configured to configure the device according to the pre-calculated configuration set, if the first UID matches the second UID. The pre-calculated configuration set comprises at least one of a software configuration setting or a hardware configuration setting.

14 Claims, 5 Drawing Sheets

501 — Storing, by the device 100, at least one pre-calculated configuration set 101 with an associated first unique identifier, UID 102.

502 — Obtaining, by the device 100, a second UID 103 locally, and/or via a communication network.

503 — Configuring, by the device 100, the device 100 according to the pre-calculated configuration set 101, if the first UID 102 matches the second UID 103, wherein the pre-calculated configuration set 101 comprises at least one of: a software configuration setting, a hardware configuration setting.

ENHANCING PROCESSING SPEED OF A REMOTE CONTROLLED RADIO FREQUENCY TEST OR MEASUREMENT DEVICE

FIELD OF THE INVENTION

The invention relates to a remote controlled radio frequency (RF) test or measurement device and to enhancing processing speed thereof. In particular, computational effort when locally or remote controlling the device is reduced. The invention also relates to a corresponding method and computer program.

TECHNICAL BACKGROUND

A conventional way of remote controlling an RF measurement device is using standard commands for programmable instruments (SCPI), or SCPI scripting. For example, save/recall is available for SCPI. This way of remote controlling in particular requires validation of each SCPI command, even for repeated measurements. SCPI thus suffers from low processing speed and high computational efforts. That is, in the prior art there is a lack of a solution which allows for fast remote control of an RF measurement device in an efficient manner.

SUMMARY OF THE INVENTION

Against this background, the object of the present invention is to enhance processing speed and reduce computational effort when remote controlling an RF measurement device.

The invention is set out in the appended set of claims. The object is solved by the features of the independent claims. The dependent claims contain further developments.

A first aspect of the present invention provides a radio frequency, RF, measurement device for enhancing processing speed and reducing computational effort, wherein the device is configured to store at least one pre-calculated configuration set with an associated first unique identifier, UID; obtain a second UID locally and/or via a communication network; and configure the device according to the pre-calculated configuration set, if the first UID matches the second UID; wherein the pre-calculated configuration set comprises at least one of: a software configuration setting, a hardware configuration setting.

This ensures that the device can be configured according to the pre-calculated configuration set in an efficient and fast manner, without the need for calculating a configuration set again after receiving a configuration instruction.

This is further advantageous, as a production RF measurement device does not have to do the calculation of configuration sets on a production line, but with same scripts the settings (i.e., the configuration sets) are just calculated once. A user who wants to remote control the RF measurement device just needs the UID for a measurement task (for a wafer, this can be 1000 dies) and does not have to reconfigure the RF measurement device each time. To speed up the configuration when using a UID, a given UID may instruct the RF measurement device to just copy information to all relevant registers via PCI express to do the configuration. Sending an SCPI command and checking for errors each time can be avoided. The pre-calculated configuration sets can e.g., be saved in an EPROM, a hard disk drive, an HW device, or in a cloud storage end be recalled from there.

Other examples of an RF measurement device include a signal generator, a power meter, an IQ capture device, a protocol tester, an OTA power transfer tester, a neutrino detector, an audio analyzer, a radar target simulator, a measurement device probe, an oscilloscope, a signal analyzer, a probe, a test device, a measurement device, etc., or any other device that uses the SCPI protocol.

For example, by transmitting a set of parameters a consistency check could be done in batch and not per parameter, which increases speed of pre-calculation of a configuration set. E.g., for a production line, a test & measurement configuration is often repeated. With this invention, all configurations or hardware settings can be pre-calculated and referenced by a UID. Thereby, repeating measurements can be started by the UID and business logic (e.g., validation) does not to be done for every measurement.

Moreover, the present invention allows for fast remote control of an RF measurement device and for building smaller and/or cheaper RF measurement device. The invention also enables an unlimited save recall (configuration) storage.

In other words, each intermediate step (in a batch or a single command) of a configuration sequence can get a separate UID. Not just SCPI settings can be stored but also final hardware settings. Storage can be distributed from cloud to HW device.

In particular, obtaining a second UID via a communication network includes obtaining the second UID locally or via USB, etc.

In an implementation form of the first aspect, the RF measurement device can be further configured to, depending on a frequency of use, obtain the pre-calculated configuration set and the associated first UID from a HW device of the device, from a storage of the device, or from a cloud device connectable to the device.

In particular, a HW device comprises at least one of: FPGA, ASIC, Shift-Register, any other IC.

In particular, a most often used pre-calculated configuration set can be stored in the HW device. In particular, a medium often used pre-calculated configuration set can be stored in the storage of the device. In particular, a less often used pre-calculated configuration set can be stored in the cloud storage.

This is beneficial as e.g., less storage is used on the device and e.g., those pre-calculated configuration set that are common to several RF measurement devices are or the ones which a particular device does not need very often are stored in the cloud storage. Thus, memory capacity in the RF measurement device itself can be saved. Pre-calculated configuration sets in the cloud can be shared between RF measurement devices, and can be used for development or optimization of hardware or software.

In a further implementation form of the first aspect, the RF measurement device can be further configured to provide the at least one pre-calculated configuration set to a cloud device for facilitating computation of measurement data in the cloud device.

This ensures that the at least one pre-calculated configuration set can be used for optimizing computation efforts or speed in other computing entities, such as a cloud device.

In a further implementation form of the first aspect, the RF measurement device can be further configured to obtain a configuration parameter via the communication network; update the at least one pre-calculated configuration set based on the configuration parameter and the second UID; and associate the updated at least one pre-calculated configuration set with a third UID generated based on the updated at least one pre-calculated configuration set.

This ensures that a pre-calculated configuration set which is already stored in the device can be updated or can be used to generate a new pre-calculated configuration set from an existing one (reference by the second UID). This updated or new set takes into account a configuration change, indicated by the configuration parameter. The updated or new pre-calculated configuration set can then be referenced by a UID, i.e., the third UID.

In a further implementation form of the first aspect, the RF measurement device can be further configured to, depending on a required speed for applying a pre-calculated configuration set, obtain the pre-calculated configuration set from a HW device of the device, from a storage of the device, or from a cloud device connectable to the device.

In particular, a pre-calculated configuration set which needs to be applied with highest speed can be stored in the HW device. In particular, a pre-calculated configuration set which needs to be applied with medium speed can be stored in the storage of the device. In particular, a pre-calculated configuration set which needs to be applied with least speed can be stored in the cloud storage.

This is beneficial as a recall of a pre-calculated configuration set may be done by a controller or even by a HW device of the device. For highest speed this can be recalled directly by the HW device or by the processor. E.g., a recall can be done via a command transmitted via a network datagram (e.g., a UDP datagram, wherein UDP stands for the computer network protocol "user datagram protocol") with the UID being directly provided to the HW device (in such an example, a network stack can be provided by the HW device and no CPU is required).

In a further implementation form of the first aspect, the RF measurement device is a small form factor, SFF, device exclusively employing a HW device and/or an ASIC.

This is beneficial, as no host computer, PCI, or cabling is needed. The SFF device can plug directly into a device under test. A shared host PC may reduce size of measurement cards for a modular measurement device such as PXI.

In a further implementation form of the first aspect, the RF measurement device can be further configured to receive a remote command and recall the second UID based on the remote command.

In particular, recalling the second UID includes reconfiguring the device according to the pre-calculated configuration set, if the first UID matches the second UID.

This improves the speed of recall and undo/redo procedures, because these are already saved and referenced.

In particular, if the first UID matches the second UID, a reconfiguration of the RF measurement device can be omitted.

In a further implementation form of the first aspect, the RF measurement device can further comprise a mapping table mapping the first UID to a pre-calculated hardware configuration setting stored externally of the RF measurement device.

This ensures that externally stored settings can be easily referenced.

In a further implementation form of the first aspect, the pre-calculated hardware configuration setting is stored in a cloud device.

This ensures that the pre-calculation of the hardware configuration setting doesn't need to be done again and again on each device or each time the device is used. This is also better for consistency since the UIDs are known, one can be sure that the settings are always the same.

In a further implementation form of the first aspect, the RF measurement device can be further configured to prefetch the externally stored pre-calculated hardware configuration setting when an execution or application of the pre-calculated hardware configuration setting is expected.

In particular, based on a customer, a location, or a previous customer behavior, the expected pre-calculated hardware configuration can be determined.

This ensures, that processing speed of the device is even further increased.

In a further implementation form of the first aspect, the UID comprises a checksum obtained during pre-calculating the pre-calculated configuration set.

In particular, the checksum is based on configuration information that was processed during calculation of the pre-calculated configuration set.

This ensures that the UID can be calculated in a determined and reproductive way. Also, UIDs which are calculated across several RF measurement devices are comparable.

In a further implementation form of the first aspect, the software configuration setting comprises at least one of: a display setting, a user setting, a P-configuration for an algorithm, a signal processing algorithm.

In a further implementation form of the first aspect, the hardware configuration setting comprises at least one of: a HW device configuration, an ASIC configuration, an instruction for a shifting register for of an IC register.

A second aspect of the present invention provides a method for enhancing processing speed and reducing computational effort of a radio frequency, RF, measurement device, wherein the method comprises the steps of: storing, by the device, at least one pre-calculated configuration set with an associated first unique identifier, UID; obtaining, by the device, a second UID locally and/or via a communication network; and configuring, by the device, the device according to the pre-calculated configuration set, if the first UID matches the second UID; wherein the pre-calculated configuration set comprises at least one of: a software configuration setting, a hardware configuration setting.

In an implementation form of the second aspect, the method comprises, depending on a frequency of use, obtaining, by the device the pre-calculated configuration set and the associated first UID from a HW device of the device, from a storage of the device, or from a cloud device connectable to the device.

In a further implementation form of the second aspect, the method can comprise providing, by the device, the at least one pre-calculated configuration set to a cloud device for facilitating computation of measurement data in the cloud device.

In a further implementation form of the second aspect, the method can comprise obtaining, by the device, a configuration parameter via the communication network; updating, by the device the at least one pre-calculated configuration set based on the configuration parameter and the second UID; and associating, by the device, the updated at least one pre-calculated configuration set with a third UID generated based on the updated at least one pre-calculated configuration set.

In a further implementation form of the second aspect, the method can comprise, depending on a required speed for applying a pre-calculated configuration set, obtaining, by the device, the pre-calculated configuration set from a HW device of the device, from a storage of the device, or from a cloud device connectable to the device.

In a further implementation form of the second aspect, the RF measurement device is a small form factor, SFF, device exclusively employing an HW device and/or an ASIC.

In a further implementation form of the second aspect, the method can further comprise receiving, by the device, a remote command and recalling, by the device, the second UID based on the remote command.

In particular, the method further comprises determining, by the device, the second UID and recalling, by the device, the pre-calculated configuration associated with the second UID.

In a further implementation form of the second aspect, the RF measurement device can further comprise a mapping table mapping the first UID to a pre-calculated hardware configuration setting stored externally of the RF measurement device.

In a further implementation form of the second aspect, the pre-calculated hardware configuration setting is stored in a cloud device.

In a further implementation form of the second aspect, the method can further comprise prefetching, by the device, the externally stored pre-calculated hardware configuration setting when an execution or application of the pre-calculated hardware configuration setting is expected.

In a further implementation form of the second aspect, the UID comprises a checksum obtained during pre-calculating the pre-calculated configuration set.

In a further implementation form of the second aspect, the software configuration setting comprises at least one of: a display setting, a user setting, a P-configuration for an algorithm, a signal processing algorithm.

In a further implementation form of the second aspect, the hardware configuration setting comprises at least one of: a HW device configuration, an FPGA configuration, an ASIC configuration, an instruction for a shifting register for of an IC register.

The second aspect and its implementation forms include the same advantages as the first aspect and its respective implementation forms.

A third aspect of the present disclosure provides a computer program comprising instructions which, when the program is executed by a computer, cause the computer to perform the method according to the second aspects or any of its implementation forms.

The third aspect includes the same advantages as the first aspect and its respective implementation forms.

An exemplary embodiment of the invention is now further explained with respect to the drawings by way of examples only, in which.

DETAILED DESCRIPTION

Figure 1:
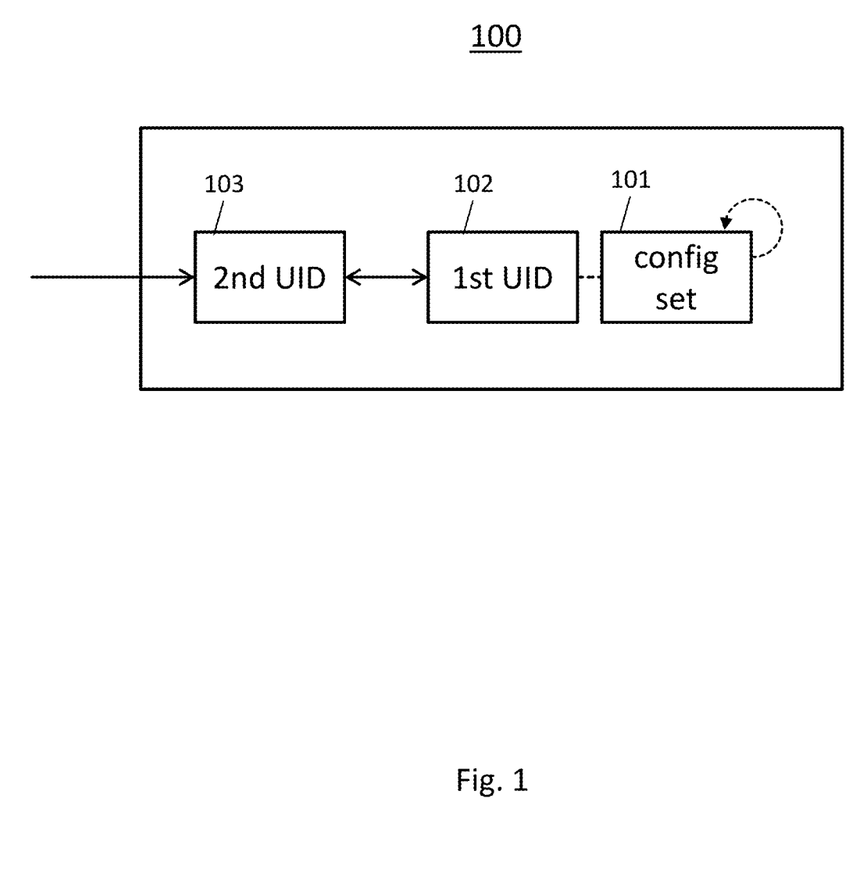
FIG. 1 shows a schematic view of an RF measurement device according to an embodiment of the present invention.

FIG. 1 shows a schematic illustration of a radio frequency, RF, measurement device 100 according to an embodiment of the present invention. The RF measurement device 100 can be at least one of: a signal generator, a power meter, an IQ capture device, a protocol tester, an OTA power transfer tester, a neutrino detector, an audio analyzer, a radar target simulator, a measurement device probe, an oscilloscope, a signal analyzer, a probe, a test device, a measurement device, etc., or any other device that uses the SCPI protocol. The device 100 is for enhancing processing speed and reducing computational effort.

To this end, the device 100 is configured to store at least one pre-calculated configuration set 101 with an associated first unique identifier, UID 102. The pre-calculated configuration set 101 comprises specific instructions for controlling the device (e.g., a test or measurement task performed by the device 100) which have been calculated according to more general user input. The UID 102 is a reference, by which a specific pre-calculated configuration set can be called.

Although there is only one pre-calculated configuration set 101 and an associated UID 102 shown in FIG. 1, there can be of course any number of such configuration set/associated UID pairs.

The device 100 is further configured to obtain a second UID 103 via a communication network, and to configure the device 100 according to the pre-calculated configuration set 101, if the first UID 102 matches the second UID 103.

The pre-calculated configuration set 101 comprises at least one of: a software configuration setting, a hardware configuration setting.

In other words, every configuration state of the device 100 has a unique reference id. The unique id with the corresponding configurations is stored e.g., in a database, and can referenced and recalled later.

Figure 2:
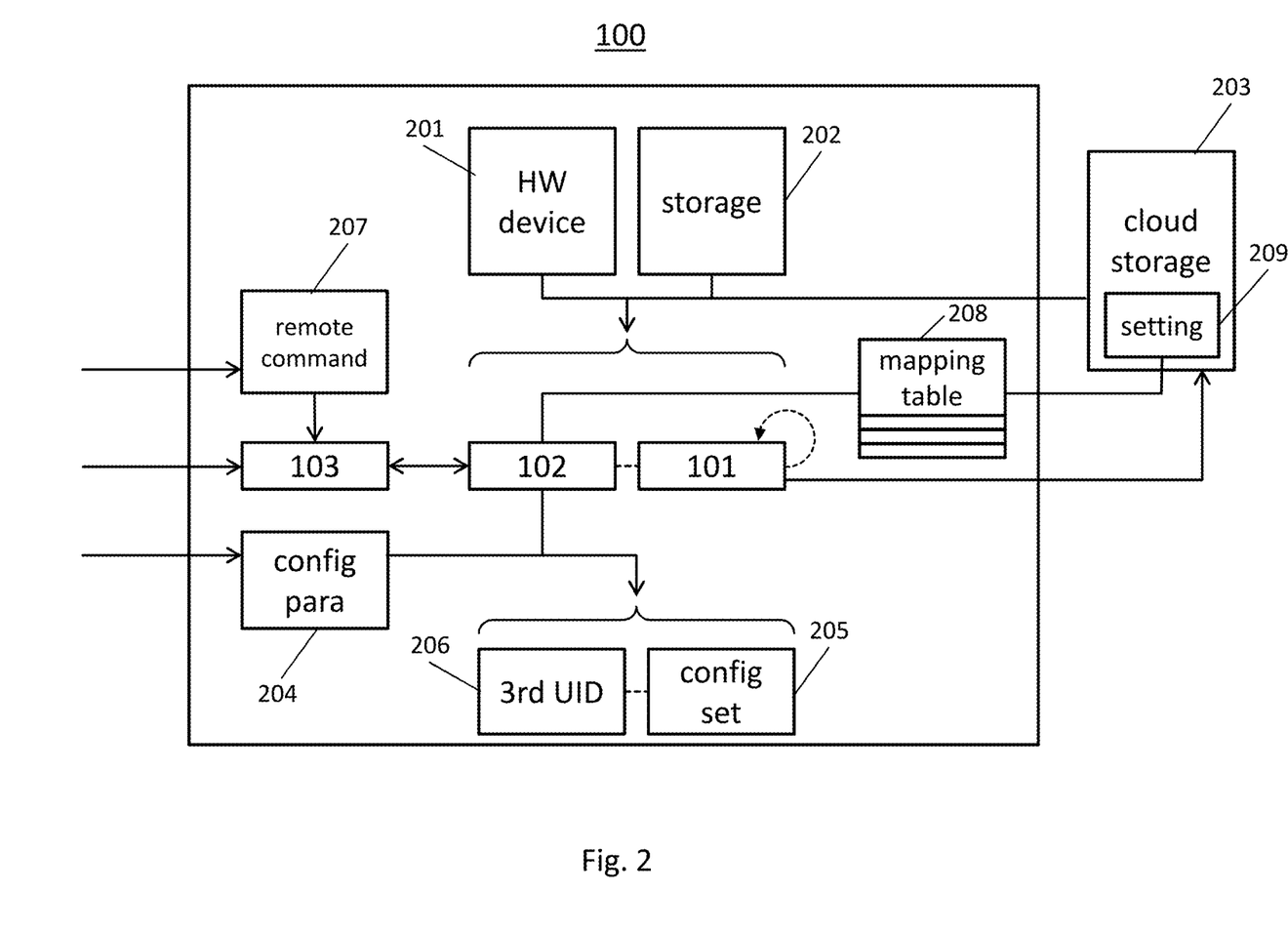
FIG. 2 shows a schematic view of an RF measurement device according to an embodiment of the present invention in more detail.

The device 100 is now going to be described in more detail in view of FIG. 2. The device 100 of FIG. 2 includes all functions and features of the device 100 as described in view of FIG. 1.

As it is shown in FIG. 2, the device 100 optionally can be configured to, depending on a frequency of use, obtain the pre-calculated configuration set 101 and the associated first UID 102 from a HW device 201 of the device 100, from a storage 202 of the device 100 or from a cloud device 203 connectable to the device 100. In other words, the information processed by the device 100 can be stored in a distributed manner, e.g. on a HW device 201, a controller of the device 100 or in a cloud device 203 connectable to the device 100. A recall (that is, configuring the device 100 based on a pre-calculated configuration set an a first UID 102) may be done on a controller or even on HW device 201 level for highest speed. E.g., a recall can be done via network, e.g. command in UDP datagram or Ethernet-frame, with a reference id for a HW device 201. A network stack could be implemented in the HW device 201, that is, no CPU might be required. For extending the depth of storage of a controller, a cloud storage 203 (local or public) can be used.

As it is further illustrated in FIG. 2, the device 100 optionally may provide the at least one pre-calculated configuration set 101 to a cloud device 203 for facilitating computation of measurement data in the cloud device 203. That is, a business logic may be transferred to cloud only, so that the measurement and processing hardware of the device 100 could be kept very small. Also, power consumption or heating can be reduced.

Further optionally, the device 100 may obtain a configuration parameter 204 via the communication network, update the at least one pre-calculated configuration set 101 based on the configuration parameter 204 and the second UID 103 and associate the updated at least one pre-calculated configuration set 205 with a third UID 206 generated based on the updated at least one pre-calculated configuration set 205. That is, new configurations (set of parameters, which are the calculated in the device 100) and commands can be pushed to the device 100 via remote control, including a UID (which specifies which pre-calculated configuration set 101 shall be updated) and create a new UID 206 (differential configuration) for the updated configuration set 205.

Further optionally, the device 100 can, depending on a required speed for applying a pre-calculated configuration set 101, obtain the pre-calculated configuration set 101 from an HW device 201 of the device 100, from a storage 202 of the device, or from a cloud device 203 connectable to the device 100. That is, depending on a minimum latency required, the storage space of the pre-calculated configuration set 101 can be selected.

Optionally, the device 100 may receive a remote command 207 and recall the second UID 103 based on the remote command. That is, the device 100 can be used for save recall by recalling the UID via remote command (production use case).

Optionally, the device 100 can comprise a mapping table 208 mapping the first UID 102 to a pre-calculated hardware configuration setting 209 stored externally of the RF measurement device 100. That is, pre-calculated hardware configuration settings 209 for each configuration UID can be stored separately and can be referenced by the UID via the internal mapping table 208. In other words, for a valid configuration, the device 100 can store internal hardware configurations referenced by a (separate) hardware UID. A mapping table 208 combines this hardware UID id with the configuration UID.

As it is illustrated in FIG. 2, the device 100 can pre-fetch the externally stored pre-calculated hardware configuration setting 209 when an execution or application of the pre-calculated hardware configuration setting 209 is expected. That is, an intelligent algorithm can pre-fetch pre-calculated HW configurations for possible next executions (from a controller or cloud 203).

Further optionally, the UID (i.e., the first, second or third UID) can comprise a checksum obtained during pre-calculating the pre-calculated configuration set 101. That is, the UID can be a checksum of the configuration and can be compared. Based on the checksum, equal configurations can be detected even if they are created with different paths of set of configuration parameters.

Figure 3:
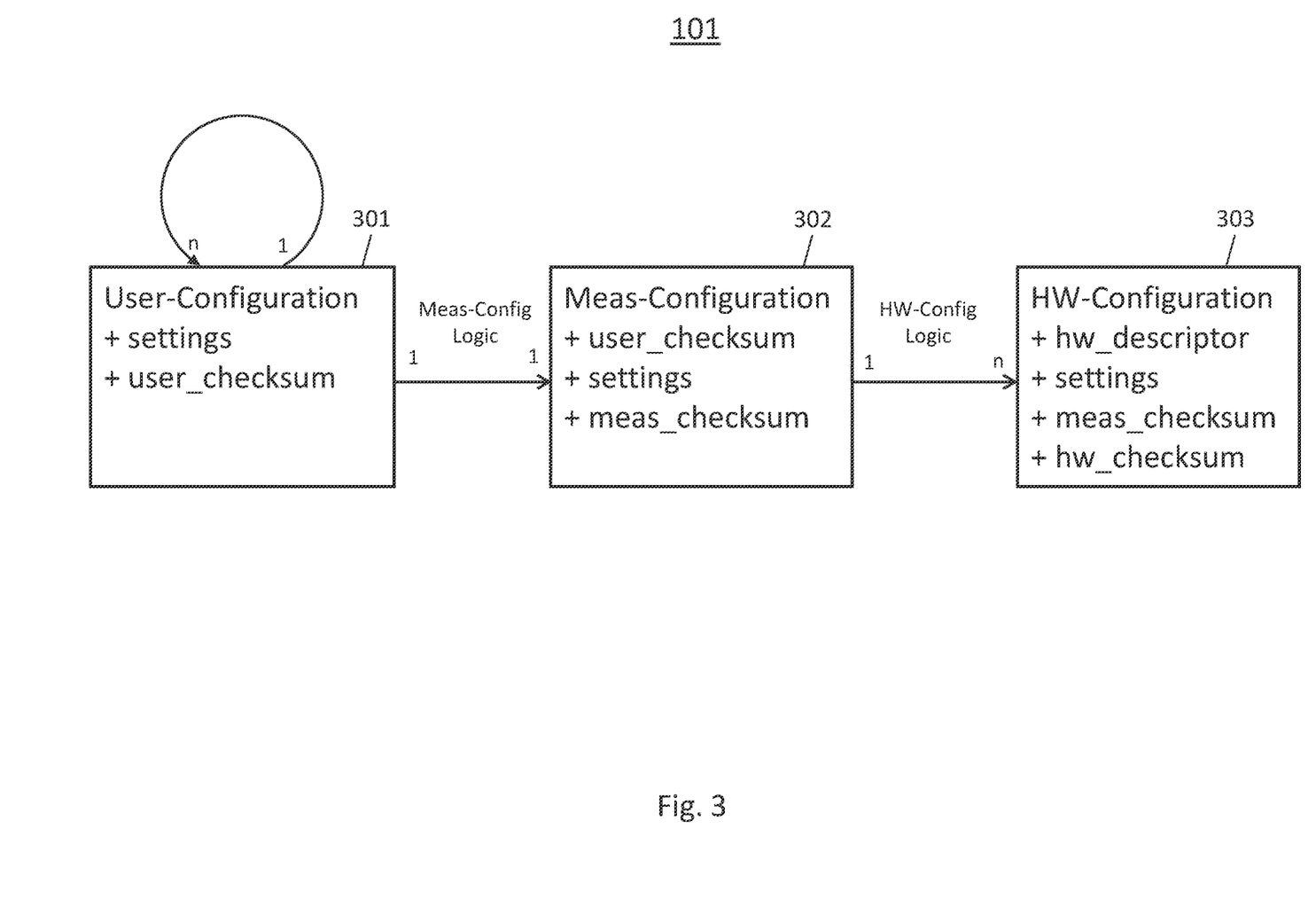
FIG. 3 shows a schematic view of configurations according to the present invention.

FIG. 3 shows an example relating to a pre-calculated configuration set 101. As illustrated, a user-configuration 301 may comprise settings and a user_checksum. The user-configuration 301 may be associated with a meas-configuration 302 (that is, a measurement configuration) in a 1 to 1 relationship. The meas-configuration can be obtained from the user-configuration by a meas-config logic. The meas-configuration 302 may comprise a user_checksum, settings and a meas_checksum. The meas-configuration 302 may be associated with a HW-configuration 303 in a 1 to n relationship. In particular, there can be 0 to n steps between user settings and HW settings. The HW-configuration can be obtained from the meas-configuration by a HW-config logic. The HW-configuration 303 in particular can be the hardware configuration 209. The HW-configuration 303 can comprise a hw_descriptor, settings, a meas_checksum and a hw_checksum. Optionally, a checksum can be regarded as a possible implementation of a UID.

Figure 4:
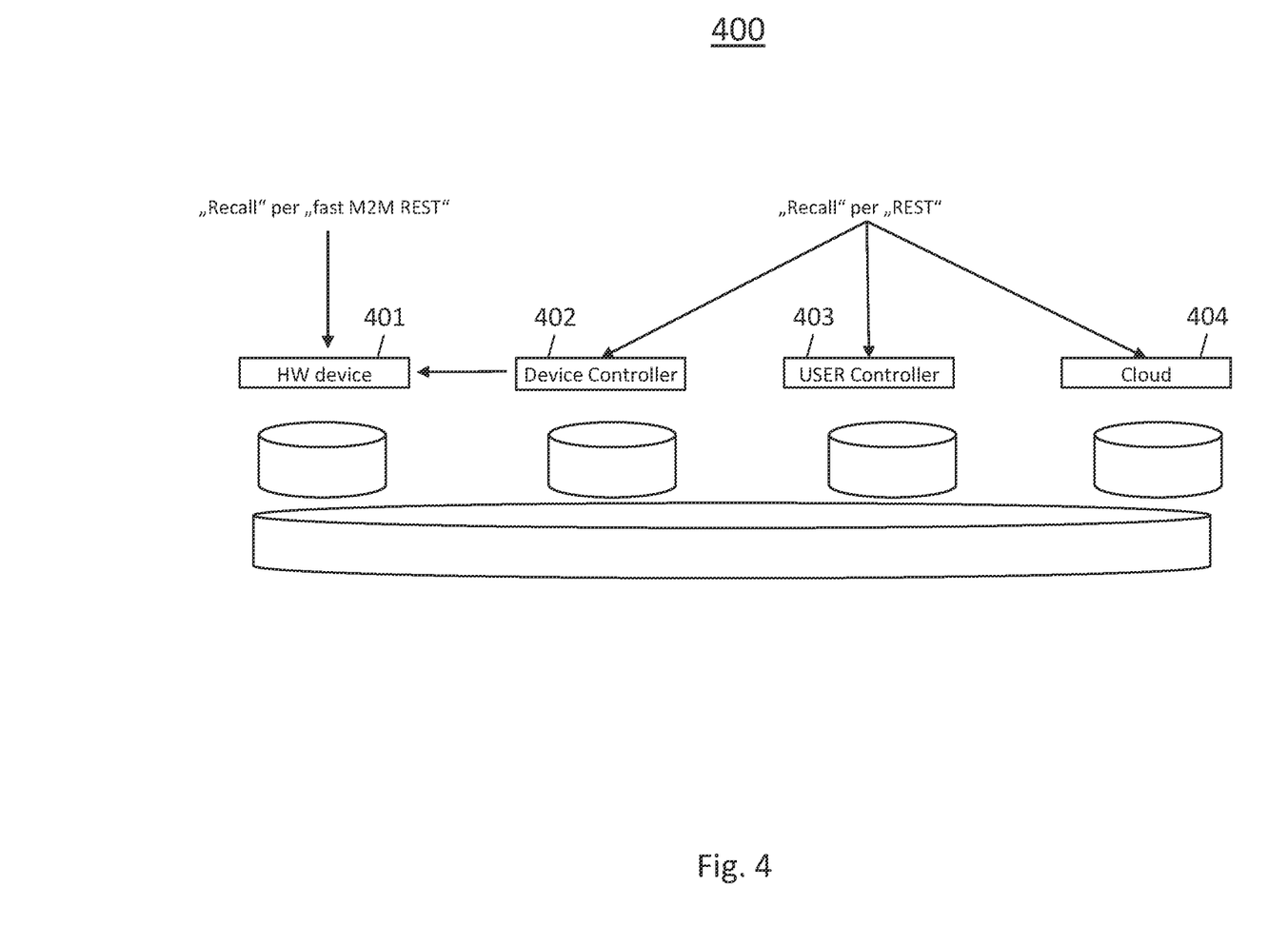
FIG. 4 shows a schematic view of data storage according to the present invention.

FIG. 4 shows an example of data storage of the at least one pre-calculated configuration set 101 and the associated first UID 102. For fastest recall, this information can be stored in a HW device 401. This can be the HW device 201 described above. A pre-calculated configuration set 101 stored in the HW device can be applied to the device 100 via recall by a stateless interface, e.g. with a "fast M2M REST" command. REST e.g. refers to RESTful http interface.

Inside the device 100, the pre-calculated configuration set 101 and the associated first UID 102 can either be stored in a device controller 402 or a user controller 403. The user controller may relate to the storage 202 described above. The pre-calculated configuration set 101 and the associated first UID 102 can also be stored in a cloud device 404 outside the device 100. This cloud device can be the cloud device 203 described above. In the latter three cases the stored information can be applied to the device 100 via a recall with a "REST" command (cf. above).

Figure 5:
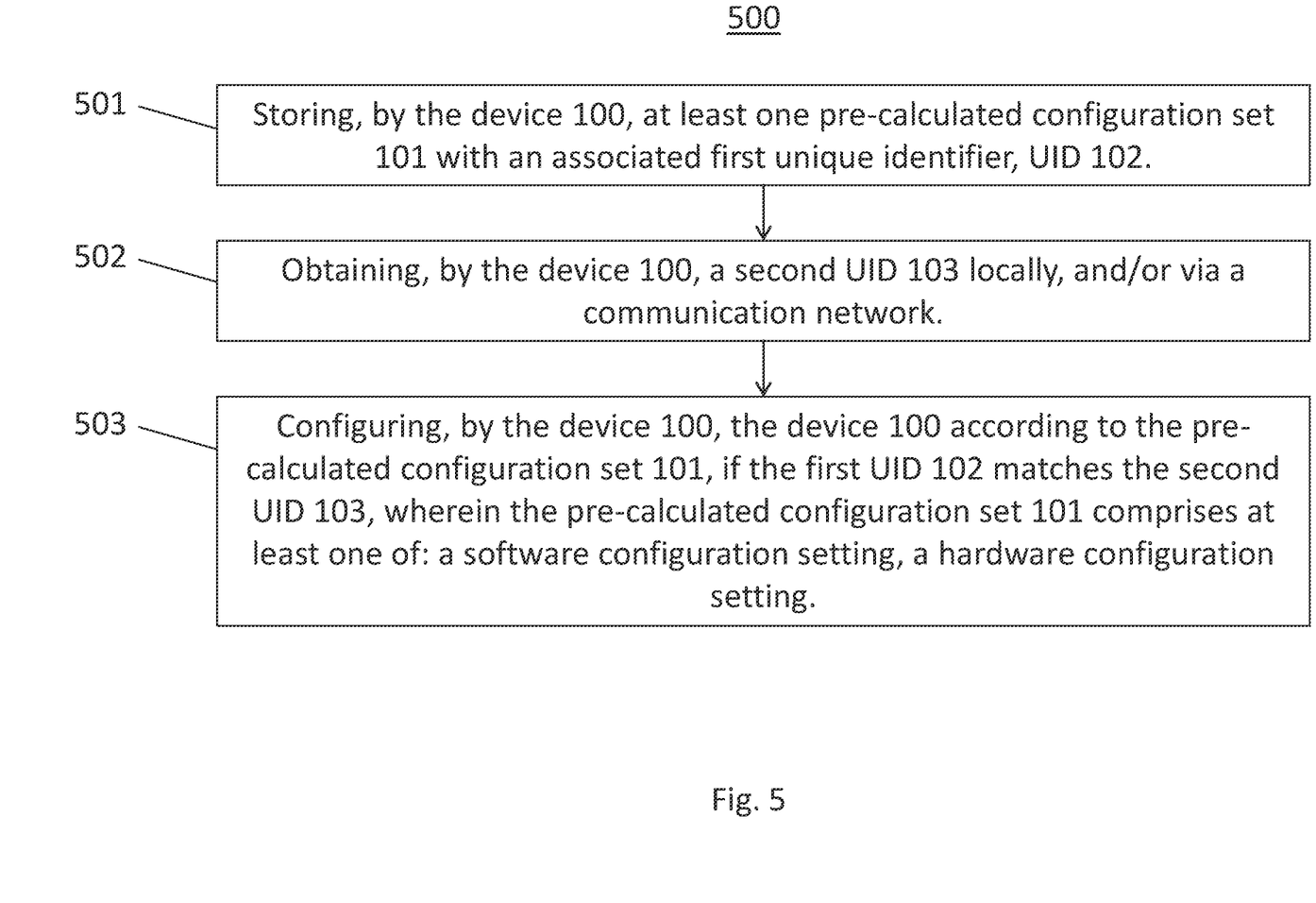
FIG. 5 shows a schematic view of a method according to an embodiment of the present invention.

FIG. 5 schematically shows a method 500 for enhancing processing speed and reducing computational effort of a radio frequency, RF, measurement device 100. The method 500 comprises a first step of storing 501, by the device 100, at least one pre-calculated configuration set 101 with an associated first unique identifier, UID 102. The method 500 comprises a second step of obtaining 502, by the device 100, a second UID 103 locally and/or via a communication network. The method 500 comprises a third step of configuring 503, by the device 100, the device 100 according to the pre-calculated configuration set 101, if the first UID 102 matches the second UID 103. The pre-calculated configuration set 101 comprises at least one of a software configuration setting or a hardware configuration setting.

It is important to note that the inventive device and method very closely correspond. Therefore, all the above said regarding the device is also applicable to the method. Everything which is described in the description and/or claimed in the claims and/or drawn in the drawings can be combined.

The invention is not limited to the illustrated embodiment. The network devices may be mobile terminals such as mobile phones, but also computers such as personal computers or the like. All features described above, or features shown in the figures can be combined with each other in any advantageous manner within the scope of the invention.

The invention claimed is:

1. A radio frequency, RF, measurement device for enhancing processing speed and reducing computational effort, wherein the device is configured to:
   store at least one pre-calculated configuration set with an associated first unique identifier, UID;
   obtain a second UID locally and/or via a communication network;
   configure the device according to the pre-calculated configuration set, if the first UID matches the second UID; and
   depending on a frequency of use, obtain the pre-calculated configuration set and the associated first UID from a HW device of the device, from a storage of the device, or from a cloud device connectable to the device,
   wherein the pre-calculated configuration set comprises at least one of: a software configuration setting, a hardware configuration setting.

2. The RF measurement device according to claim 1, further configured to provide the at least one pre-calculated configuration set to a cloud device for facilitating computation of measurement data in the cloud device.

3. The RF measurement device according to claim 1, further configured to:
   obtain a configuration parameter via the communication network;

update the at least one pre-calculated configuration set based on the configuration parameter and the second UID; and associate the updated at least one pre-calculated configuration set with a third UID generated based on the updated at least one pre-calculated configuration set.

4. The RF measurement device according to claim 1, further configured to, depending on a required speed for applying a pre-calculated configuration set, obtain the pre-calculated configuration set from a HW device of the device, from a storage of the device, or from a cloud device connectable to the device.

5. The RF measurement device according to claim 1, wherein the RF measurement device is a small form factor, SFF, device exclusively employing a HW device and/or an ASIC.

6. The RF measurement device according to claim 1, further configured to receive a remote command and recall the second UID based on the remote command.

7. The RF measurement device according to claim 1, further comprising a mapping table mapping the first UID to a pre-calculated hardware configuration setting stored externally of the RF measurement device.

8. The RF measurement device according to claim 1, wherein the pre-calculated hardware configuration setting is stored in a cloud device.

9. The RF measurement device according to claim 1, further configured to pre-fetch externally stored pre-calculated hardware configuration setting when an execution or application of the pre-calculated hardware configuration setting is expected.

10. The RF measurement device according to claim 1, wherein the UID comprises a checksum obtained during pre-calculating the pre-calculated configuration set.

11. The RF measurement device according to claim 1, wherein the software configuration setting comprises at least one of: a display setting, a user setting, a P-configuration for an algorithm, a signal processing algorithm.

12. The RF measurement device according to claim 1, wherein the hardware configuration setting comprises at least one of: a HW device configuration, an ASIC configuration, an instruction for a shifting register for of an IC register.

13. A method for enhancing processing speed and reducing computational effort of a radio frequency, RF, measurement device, wherein the method comprises the steps of:

storing, by the device, at least one pre-calculated configuration set with an associated first unique identifier, UID;

obtaining, by the device, a second UID locally and/or via a communication network;

configuring, by the device, the device according to the pre-calculated configuration set, if the first UID matches the second UID; and depending on a frequency of use, obtaining, by the device, the pre-calculated configuration set and the associated first UID from a HW device of the device, from a storage of the device, or from a cloud device connectable to the device, wherein the pre-calculated configuration set comprises at least one of: a software configuration setting, a hardware configuration setting.

14. A non-transitory computer readable medium comprising instructions which, when executed by a computer, cause the computer to carry out the method according to claim 13.

* * * * *